(12) United States Patent
He

(10) Patent No.: US 7,283,064 B2
(45) Date of Patent: Oct. 16, 2007

(54) SYSTEM AND METHOD FOR FACILITATING TARGET AIMING AND AIRCRAFT CONTROL USING AIRCRAFT DISPLAYS

(75) Inventor: Gang He, Morristown, NJ (US)

(73) Assignee: Honeywell International, Inc., Morristown, NJ (US)

( * ) Notice: Subject to any disclaimer, the term of this patent is extended or adjusted under 35 U.S.C. 154(b) by 207 days.

(21) Appl. No.: 11/103,878

(22) Filed: Apr. 12, 2005

(65) Prior Publication Data

US 2006/0227012 A1 Oct. 12, 2006

(51) Int. Cl.
G01C 23/00 (2006.01)

(52) U.S. Cl. .......................... 340/973; 340/974; 701/14

(58) Field of Classification Search ................ 340/972, 340/973, 974, 975, 976, 980; 701/4, 14
See application file for complete search history.

(56) References Cited

U.S. PATENT DOCUMENTS

| | | | |
|---|---|---|---|
| 4,040,005 A | | 8/1977 | Melvin |
| 4,147,056 A | * | 4/1979 | Muller ...................... 73/178 T |
| 4,247,843 A | | 1/1981 | Miller et al. |
| 4,554,545 A | * | 11/1985 | Lowe .......................... 340/980 |
| 5,289,185 A | * | 2/1994 | Ramier et al. .............. 340/971 |
| 5,798,713 A | | 8/1998 | Viebahn et al. |
| 6,054,937 A | * | 4/2000 | Von Viebahn et al. ...... 340/961 |

FOREIGN PATENT DOCUMENTS

EP 0384993 9/1990

WO 9527186 10/1995

OTHER PUBLICATIONS

Tuttle et al., Terminal Area Operations With Enhanced and Synthetic Vision: Experience in the Boeing Technology Demonstrator, Proc. of SPIE, Apr. 21, 2003, pp. 136-145, vol. 5081, Orlando, FL.

* cited by examiner

Primary Examiner—Brent A. Swarthout
(74) Attorney, Agent, or Firm—Ingrassia Fisher & Lorenz

(57) ABSTRACT

An improved system and method are disclosed for facilitating target aiming and aircraft control by flight crews using electronic displays. For example, an aircraft display system is disclosed that includes a database for storing target location and boundary data, a processing unit, a position and direction determination unit for use in determining the position of an aiming symbol on a display, a graphics display generator, and a visual display. The processing unit determines whether or not a selected target to be displayed is obscured or covered by the aiming symbol to be displayed. If any portion of the target is obscured or covered by the aiming symbol, then the processing unit directs the graphics display generator to generate graphic control signals for the visual display, which increase the transparency of the portions of the aiming symbol that obscure or cover the target. Notably, the transparency of any symbol (or portion of a symbol) can be increased if that symbol obscures or covers a target being displayed or viewed. Thus, the visibility of targets viewed using onboard visual displays is significantly enhanced, whereby the targets are obscured by the symbols used to aim and control the aircraft. Advantageously, target aiming and aircraft control are facilitated, which reduces pilot workload and navigation errors, and thus results in increased aircraft safety.

20 Claims, 4 Drawing Sheets

SYSTEM AND METHOD FOR FACILITATING TARGET AIMING AND AIRCRAFT CONTROL USING AIRCRAFT DISPLAYS

FIELD OF THE INVENTION

The invention relates generally to the field of display systems, and more specifically, but not exclusively, to a system and method for facilitating target aiming and aircraft control using aircraft displays.

BACKGROUND OF THE INVENTION

Computer generated aircraft displays have become highly sophisticated and are capable of displaying a substantial amount of flight management and control information, which gives flight crews more effective control of their aircraft and helps to reduce their workload. This reduction in flight crew workload results in fewer pilot errors and thus enhances flight safety. In this regard, electronic displays, such as Heads-Up Displays (HUDs) and Heads-Down Displays (HDDs), are used in aircraft as Primary Flight Displays (PFDs) to display important flight management and control information to flight crews.

Flight Path Vectors are known and widely used in HUDs and HDDs in PFDs. A Flight Path Vector (also known as a Flight Path Marker) is a symbol displayed on a PFD, which represents the sum of all of the forces acting on the aircraft involved, and indicates the direction or track of the aircraft's movement through space. The Flight Path Vector information displayed may be obtained from an onboard inertial guidance system, navigation system, Global Positioning System (GPS) receiver, attitude sensors, etc. In any event, Flight Path Vectors have proven to be an effective visual tool for controlling aircraft and reducing the workload for flight crews.

Flight Path Vectors are typically displayed as circular symbols. For illustrative purposes, a pictorial representation of a conventional electronic aircraft display, which illustrates a conventional use of a Flight Path Vector, is shown in FIG. 1. Referring to FIG. 1, display 100 can represent a PFD in an onboard electronic display (e.g., HDD). As shown, display 100 includes, among other things, a Flight Path Vector symbol 102 and an airport runway symbol 104. As the aircraft approaches an airport for landing, the pilot locates the intended target (runway 104, in this illustrative example) on display 100, and aims the aircraft in the direction of the target (runway 104). The pilot aims the aircraft at the target (runway 104) by controlling the aircraft's movement, so that the target remains in the close vicinity of the circular symbol representing Flight Path Vector 102. The optimum condition for landing is for the aircraft to be aimed directly at the nearest end of the runway. Consequently, the pilot attempts to control and aim the aircraft so that the Flight Path Vector symbol 102 is placed directly on the nearest end of the runway symbol 104. Alternatively, if a HUD is being used, the pilot may see an actual runway, so in this case, the pilot attempts to control and aim the aircraft so that the Flight Path Vector symbol (e.g., similar to symbol 102) electronically displayed on the HUD is placed in perspective directly on the nearest end of the actual runway being seen through the HUD screen.

Notwithstanding the distinct advantages of the use of Flight Path Vectors on aircraft displays, a significant drawback of existing aircraft displays is that the existing Flight Path Vector symbols (and other similar symbols being displayed) can obscure the targets that the pilots are attempting to see. For example, as illustrated by display 100 in FIG. 1, Flight Path Vector symbol 102 is shown covering and obscuring a significant portion of runway symbol 104. Since the size of Flight Path Vector 102 typically remains the same on display 100, and runway symbol 104 (or the actual runway being seen) is displayed or viewed in perspective (i.e., appears smaller at a longer distance), the Flight Path Vector symbol can significantly obscure the target especially at the longer distances. This loss of visual contact of the target by the pilot decreases the accuracy of the pilot's aim, and thus increases the possibility that navigation errors can occur. Therefore, it would be advantageous to have a system and method that enhances the visibility of a target on an electronic display when a Flight Path Vector symbol (or other symbol) is also being displayed. As described in detail below, the present invention provides such a system and method, which resolves the target visibility problems encountered by pilots with existing aircraft displays and other prior art displays, and thus facilitates target aiming and aircraft control by pilots using electronic displays.

SUMMARY OF THE INVENTION

The present invention provides an improved system and method for facilitating target aiming and aircraft control by flight crews using electronic displays. In accordance with a preferred embodiment of the present invention, an aircraft display system is provided that includes a database for storing target location and boundary data, a processing unit, a position and direction determination unit for use in determining the position of an aiming symbol on a display, a graphics display generator, and a visual display. The processing unit determines whether or not a selected target to be displayed is obscured or covered by the aiming symbol to be displayed. If any portion of the target is obscured or covered by the aiming symbol, then the processing unit directs the graphics display generator to generate graphic control signals for the visual display, which increase the transparency of the portions of the aiming symbol that obscure or cover the target. Notably, in accordance with the principles of the present invention, the transparency of any symbol (or portion of a symbol) can be increased if that symbol obscures or covers a target being displayed or viewed. Thus, the present invention enhances the visibility of targets viewed using onboard visual displays, in which the targets are obscured by the symbols used to aim and control the aircraft. Advantageously, the present invention facilitates target aiming and aircraft control, which reduces pilot workload and navigation errors, and thus results in increased aircraft safety.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
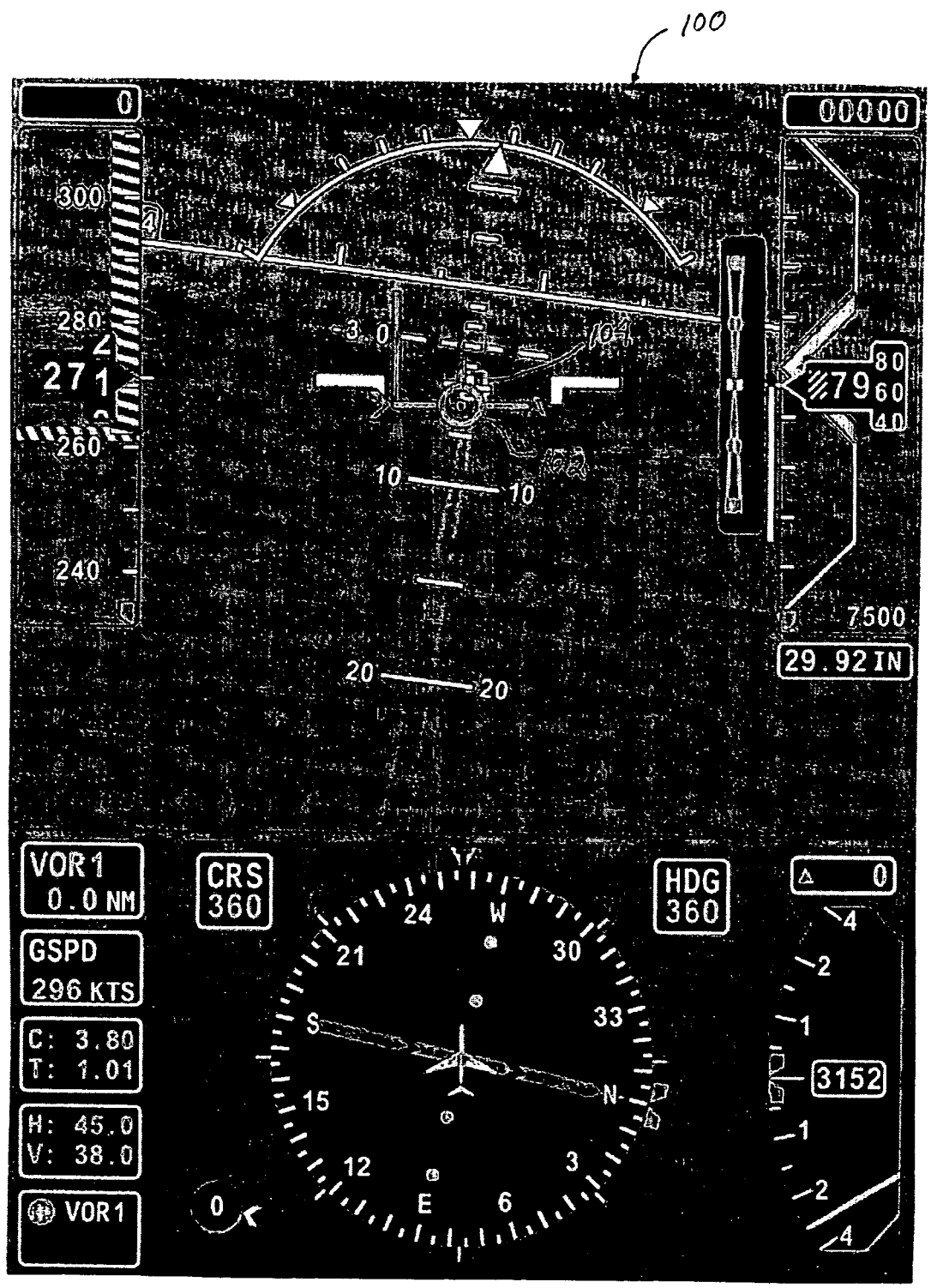
FIG. 1 depicts a pictorial representation of a conventional electronic aircraft display, which illustrates a conventional use of a Flight Path Vector.
Figure 2:
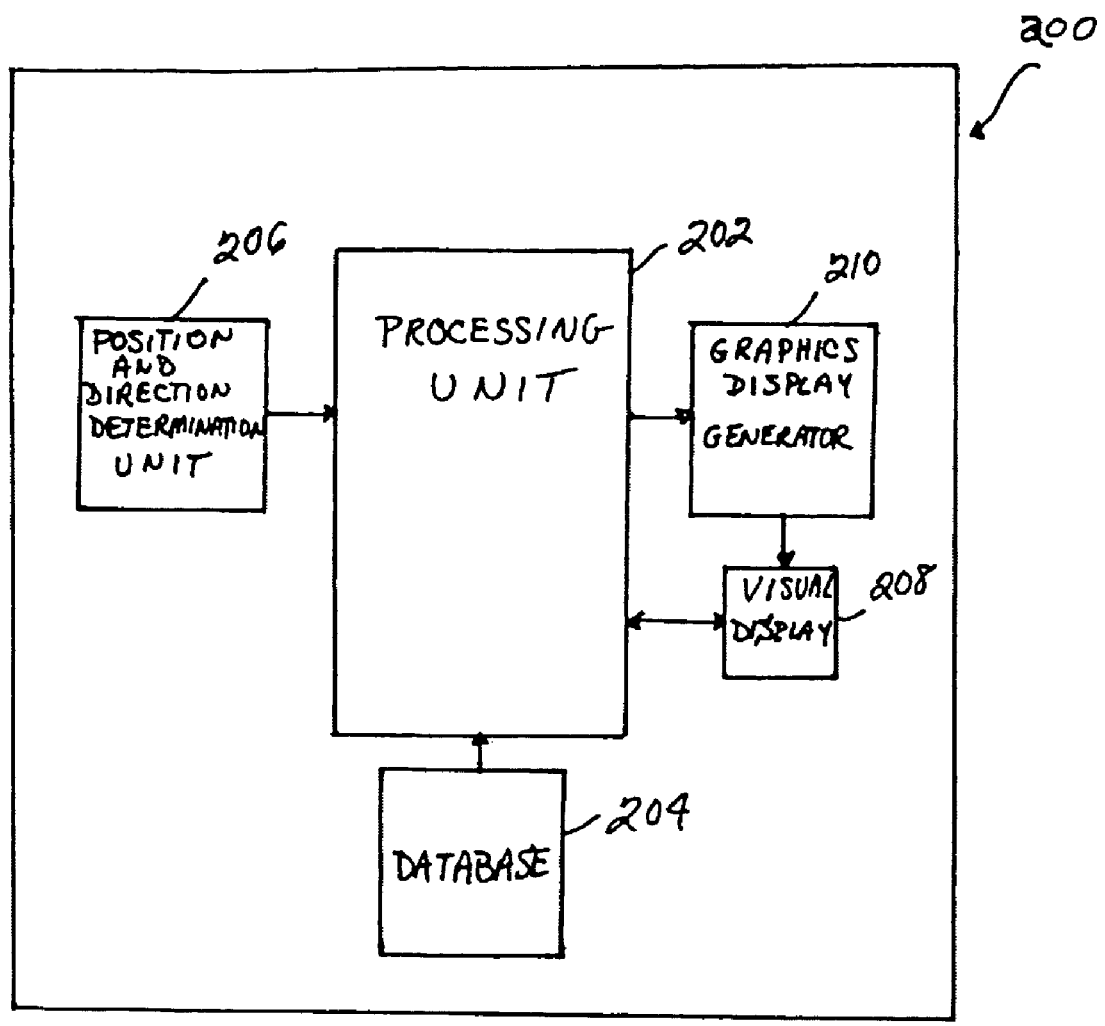
FIG. 2 depicts a block diagram of an example system for facilitating target aiming and aircraft control using an aircraft display, which can be used to implement a preferred embodiment of the present invention.

With reference now to the figures, FIG. 2 depicts a block diagram of an example system 200 for facilitating target aiming and aircraft control using an aircraft display, which can be used to implement a preferred embodiment of the present invention. For this example, system 200 includes a processing unit 202, a database 204, a position and direction determination unit 206, a visual display 208, and a graphics display generator 210. Notably, it should be understood that although system 200 appears in FIG. 2 to be arranged as an integrated system, the present invention is not intended to be so limited and can also include an arrangement whereby one or more of processing unit 202, database 204, position and direction determination unit 206, visual display 208, and graphics display generator 210 is a separate component or a subcomponent of another system located either onboard or external to an aircraft. Also, for example, system 200 can be arranged as an integrated system (e.g., aircraft display system, etc.) or a subsystem of a more comprehensive aircraft system (e.g., flight management system, navigation system, target aiming and control system, collision alert and/or avoidance system, weather avoidance system, etc.).

For this embodiment, processing unit 202 can be a computer processor such as, for example, a microprocessor, digital signal processor, or any suitable processor capable of at least receiving and/or retrieving aircraft position and control information, and target location information, generating display control signals for a visual display of the target information and/or a Flight Path Vector, and sending the generated display control signals to a graphics display generator (e.g., graphics display generator 210) associated with a visual display (e.g., visual display 208). For example, processing unit 202 can be arranged as a single processor or plurality of processors connected to a data communications bus or system bus. A memory controller/cache can also be connected to the data communications bus or system bus, which can provide an interface between processing unit 202 and a local memory (e.g., RAM, ROM, etc.). A plurality of machine instructions can be stored in the local memory and retrieved and operated on by processing unit 202 to generate the control signals for the graphics display generator and visual display. An Input/Output (I/O) bus bridge can also be connected to the data communications bus or system bus, which can provide an interface between processing unit 202 and an I/O bus. Thus, processing unit 202 can receive, retrieve and/or send data via such an I/O bus. In any event, those of ordinary skill in the art will appreciate that the hardware described herein for processing unit 202 in FIG. 2 may vary. As such, the depicted example is provided for illustrative purposes and not meant to imply any architectural limitations with respect to the present invention.

For this example embodiment, system 200 also includes database 204 coupled to processing unit 202 (e.g., via an I/O bus connection). For example, database 204 can be a memory device (e.g., non-volatile memory, disk, drive, tape, optical storage device, mass storage device, etc.) that can store digital target location data (e.g., latitudinal and longitudinal data) as either absolute coordinate data or as a function of an aircraft's position. A source for the digital target location data stored in database 204 can be, for example, a United States Geological Survey (USGS) map having a resolution of approximately 90 meters, which includes topographical relief information that can be used to apply grid lines following the contour of terrain. As such, database 204 can store a target location database that includes data defining the actual geographical boundaries of numerous airports and runways.

Database 204 can also include, for example, a terrain database, which can include the locations and elevations of natural terrain obstacles such as mountains or other elevated ground areas, and also the locations and elevations of man-made obstacles such as radio antenna towers, buildings, bridges, etc. A terrain database stored in database 204 can also include, for example, the boundaries of restricted airspace, restricted elevations for particular airspace, bodies of water, etc. As yet another example, a terrain database stored in database 204 can be a Jeppesen-styled database, which can cover a 300 by 270 mile area of terrain and include topographical relief information. As still another example, airport and runway location data and terrain data stored in database 204 can be received from an onboard device that senses and maps man-made obstacles (e.g., airports, runways, etc.) and variations in terrain, such as, for example, a Forward Looking Infrared (FLIR) sensor, or an active or passive type of radar device. As another example, airport and runway location data, and other types of high priority target data (e.g., locations of incoming traffic to avoid, constructed waypoints, obstacles in the aircraft's flight path, etc.) can be retrieved and/or received by processing unit 202 from a suitable source of such data, such as, for example, an onboard flight management system navigation database, an onboard FLIR sensor or radar device, or an external database (e.g., via a data communication up-link).

For this embodiment, system 200 also includes a position and direction determination unit 206 coupled to processing unit 202 (e.g., via an I/O bus connection). For example, position and direction determination unit 206 can provide navigation data associated with the aircraft's current position and flight direction or track to processing unit 202. Position and direction determination unit 206 can obtain the navigation data from an onboard navigation system that can include, for example, an inertial navigation system, a satellite navigation system (e.g., Global Positioning System) receiver, VLF/OMEGA, Loran C, VOR/DME, DME/DME, IRS, aircraft attitude sensors, or from a Flight Management System. The navigation system can also provide information to position and direction determination unit 206 about the aircraft's altitude relative to sea level, if such information is desired. In any event, for this example embodiment, position and direction determination unit 206 can include any suitable position and direction determination devices that are capable of providing processing unit 202 with at least an aircraft's current position (e.g., in latitudinal and longitudinal form) and the real-time direction or track of the aircraft in its flight path.

For this embodiment, system 200 also includes a visual display 208 coupled to processing unit 202 (e.g., via an I/O bus connection) and graphics display generator 210. For example, visual display 208 may include any device suitable for displaying various types of symbols and information representing at least target data and Flight Path Vector data in an integrated, multi-color or monochrome form. Using aircraft position and direction (or track) data retrieved (or received) from position and direction determination unit 206, and target data retrieved from database 204, processing unit 202 executes one or more algorithms (e.g., implemented in software) for determining the position of a Flight Path Vector relative to a target at which the aircraft is being aimed, and generating a plurality of display control signals representing the Flight Path Vector and the target involved. Processing unit 202 sends the plurality of display control signals to visual display 208 via graphics display generator 210. Preferably, for this embodiment, visual display 208 is an aircraft cockpit, multi-color display. Graphics display generator 210 interprets the received plurality of display control signals and generates suitable Flight Path Vector symbols and target symbols, which are presented on a screen or monitor of visual display 208. Notably, although a conventional cockpit display screen may be used to display the Flight Path Vector data and target data, the present invention is not intended to be so limited and can include any suitable type of display medium capable of visually presenting multi-colored or monochrome Flight Path Vector (or Flight Path Marker) information and target information for a pilot or other flight crew member. As such, many known display monitors are suitable for displaying such Flight Path Vector and target information, such as, for example, various CRT and flat-panel display systems (e.g., CRT displays, LCDs, OLED displays, plasma displays, projection displays, HDDs, HUDs, etc.). For example, visual display 208 can be implemented as a heads-down PFD by a DU-1080 Display Unit or DU-1310 Display Unit, which are color active matrix LCD-based devices produced by Honeywell International, Inc. of Morristown, N.J. Also, an example HUD that can be used for visual display 208 is the HUD2020 device also produced by Honeywell International, Inc.

For this example embodiment, system 200 also includes graphics display generator 210, which can be configured to provide Flight Path Vector data and target data to a screen or monitor of visual display 208 (e.g., responsive to operations of processing unit 202). The target data may include, for example, data from a navigation database, traffic and collision avoidance system, up-linked data from an external database, data from a FLIR sensor or radar device, and/or any other suitable source of target information useful to a pilot or other flight crew member. The Flight Path Vector (or Flight Path Marker) data may include, for example, data from an onboard inertial guidance system, navigation system, flight management system, etc. For this embodiment, graphics display generator 210 (e.g., responsive to operations of processing unit 202) may render a multi-colored or monochrome image of a Flight Path Vector symbol (e.g., circular symbol) and a target symbol (e.g., defined by a location and boundary of an airport, runway, another aircraft, etc.) on a screen of visual display 208, along with relevant navigation information (e.g., suitable symbols representing locations of man-made obstacles and natural obstacles, etc.). Graphics display generator 210 (e.g., responsive to operations of processing unit 202) may also render multi-colored or monochromatic images of terrain and weather data on the screen of visual display 208. Notably, in accordance with the principles of the present invention, the transparency of all or part of the Flight Path Vector symbol displayed on the screen of visual display 208 may be increased or decreased responsive to a suitable algorithm (e.g., implemented in software) executed by processing unit 202, which functions to increase or decrease, respectively, the visibility of the target also being displayed.

Figure 3:
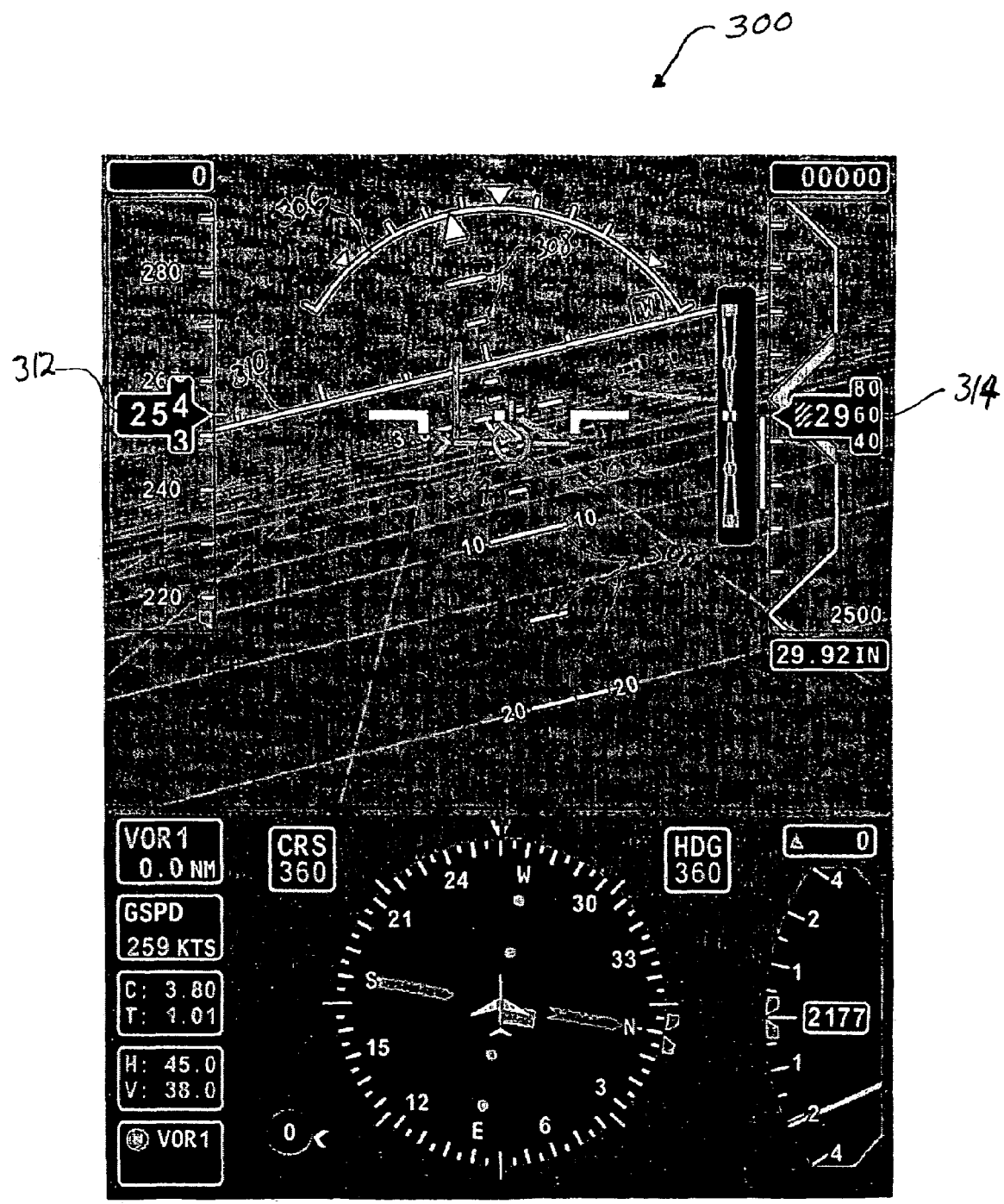
FIG. 3 depicts a pictorial representation of a visual display, which includes a visual representation of a Primary Flight Display that illustrates a preferred embodiment of the present invention.

FIG. 3 depicts a pictorial representation of a visual display, which illustrates such functions of a dynamic Flight Path Vector display.

Referring to FIG. 3, a pictorial representation of a visual display 300 (e.g., presentation for visual display 208 in FIG. 2) is shown, which includes a visual representation of a PFD that illustrates a preferred embodiment of the present invention. For this example embodiment, visual display 300 is a heads-down PFD. However, the present invention is not intended to be so limited and can also be implemented with any suitable type of electronic aircraft display (e.g., HUD) that can display at least Flight Path Vector information and target information. For example, an airport symbol (not shown) can be displayed when an aircraft is higher than 1,000 feet above ground level (AGL) or positioned at a significant distance from the airport involved, because the relative size of the airport makes it visible from that altitude or distance. However, as the aircraft approaches the airport, the runway symbol 304 appears (e.g., as illustrated in display 300), and the airport symbol is typically removed from the display.

When the aircraft is at a particular distance from the airport, the pilot begins controlling the aircraft so as to aim a Flight Path Vector (symbol) 302 at a selected portion of the runway (symbol) 304. Display 300 also provides, among other things, a conventional visual representation of a roll scale 306, a pitch scale 308, a pitch reference 310, a heading pointer 312, and an altitude pointer 314. As such, for this example embodiment, it may be assumed that an aircraft including visual display 300 is on approach to runway 304 in order to land the aircraft. Consequently, it may be assumed that the pilot is controlling the direction or track of the aircraft so that Flight Path Vector 302 is aimed directly at the nearest end of runway 304. Importantly, in accordance with the principles of the present invention, note that the transparency of Flight Path Vector 302 has been increased (e.g., by operations of processing unit 202 in FIG. 2) so that the underlying portions of runway 304 are not obscured by Flight Path Vector 302. Thus, the present invention's dynamic control of the transparency of Flight Path Vector 302 enhances the ability of the pilot to aim the aircraft at runway 304 and reduces navigation, control and pilot errors as a result. Notably, although the transparency of a Flight Path Vector symbol is being increased to enhance the visibility of a target in the illustrative embodiment of FIG. 3, the present invention is not intended to be so limited. In other words, in accordance with the principles of the present invention, the transparency of any symbol being displayed that is covering or obscuring all or any part of a target can be increased to enhance the visibility of the target. For example, the transparency can be increased for any displayed symbol that is covering or obscuring any part of a high priority target, such as a symbol for dangerous, on-coming traffic or obstacles, or an approaching aircraft or obstacle actually being viewed (e.g., through a HUD screen).

Figure 4:
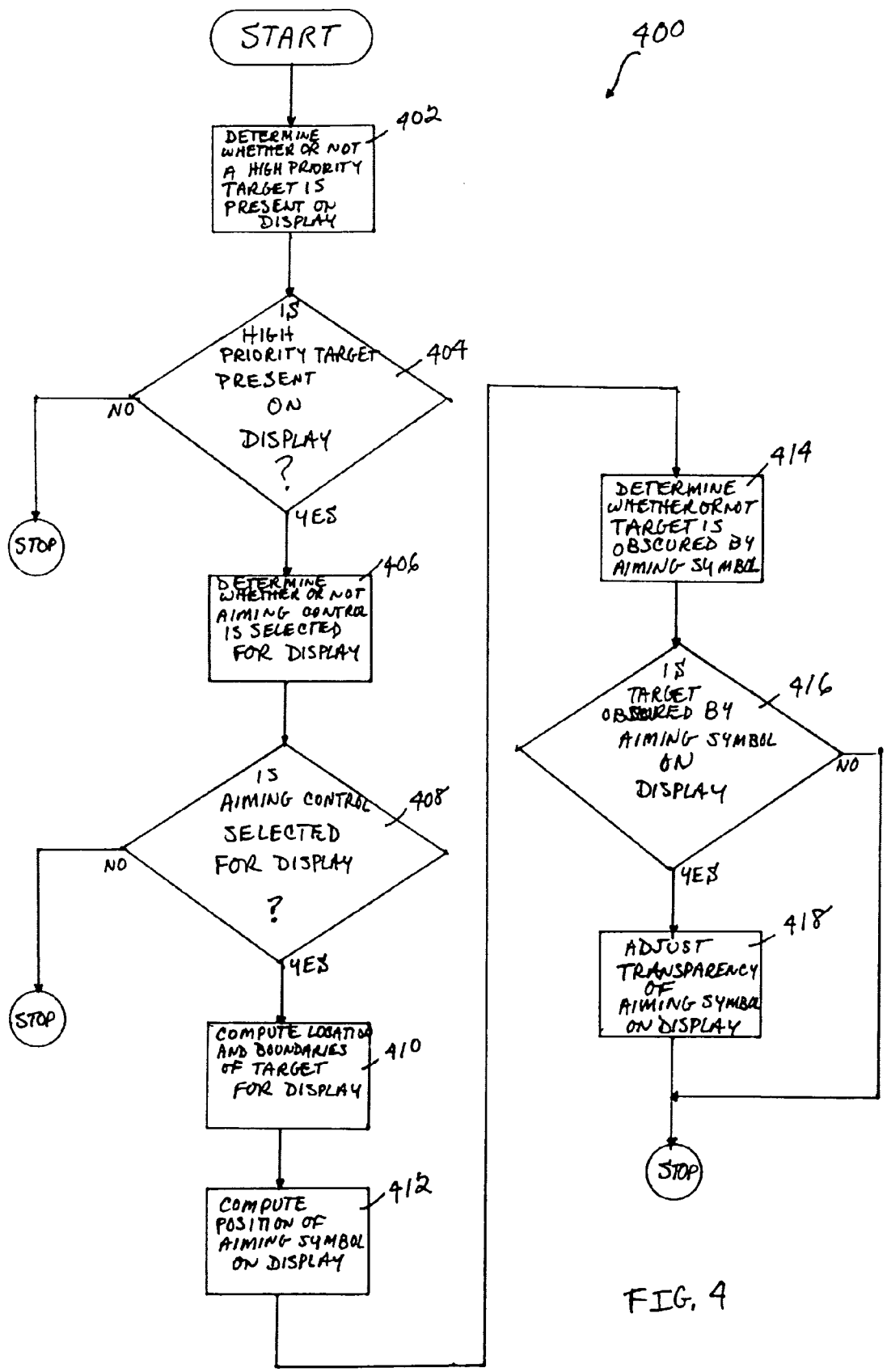
FIG. 4 depicts a flow chart showing an exemplary method for facilitating target aiming and aircraft control using a visual display, in accordance with a preferred embodiment of the present invention.

FIG. 4 depicts a flow chart showing an exemplary method 400 for facilitating target aiming and aircraft control using a visual display, in accordance with a preferred embodiment of the present invention. Referring to FIGS. 2 and 4, for this example, processing unit 202 determines whether or not a high priority target is present on visual display 208 (step 402). For example, processing unit 202 can determine if a runway, airport, other aircraft, man-made or natural obstacle, etc. is being presented on visual display 208, by retrieving target location data from database 204, and comparing the retrieved target location data with the boundary data for the total geography being displayed to determine if the target's location falls within the boundaries of the geography being displayed. Also, for example, processing unit 202 can determine that a high priority target is being displayed in response to a flight crew member's input (e.g., button, cursor, keyboard, etc.) to processing unit 202, which selects a particular item (e.g., from the visual display) and defines that item as a high priority target. If processing unit 202 determines that no high priority target is present on visual display 208 (step 404), then the flow can be terminated.

However, if (at step 404) processing unit 202 determines that a high priority target is being displayed, then processing unit 202 determines whether or not aiming control using the display has been selected (step 406). This selection can be made by a pilot or other flight crew member by a suitable input command to processing unit 202. If processing unit 202 determines that aiming control has not been selected (step 408), then the flow can be terminated. However, if (at step 408) processing unit 202 determines that aiming control using the display (e.g., visual display 208) has been selected, then processing unit 202 computes the location and boundary information for the high priority target being displayed (step 410). Processing unit 202 also computes the position of the aiming symbol presented on the display (step 412). For this example embodiment, the aiming symbol preferably used is a Flight Path Vector symbol (or Flight Path Marker symbol). However, the present invention is not intended to be so limited, and any suitable symbol that represents the forces acting on a aircraft in flight, the track or direction of an aircraft in flight, and/or an aiming point for an aircraft in flight, can be used for an aiming symbol to be presented on a visual display for aircraft control. Also, it is important to note that although the use of an aiming symbol is being described herein for illustrative purposes, the present invention also contemplates the use of any suitable symbol for aircraft control, which may be covering or obscuring a target being shown on or seen through an aircraft's visual display.

Next, processing unit 202 determines whether or not any part of the target to be (or being) displayed is obscured or covered by the aiming symbol or other symbol to be (or being) displayed (step 414). For example, processing unit 202 can execute a suitable algorithm (e.g., implemented in software) that compares the target location and boundary information with the geometry and aim point of the aiming symbol used to determine if any portion of the target is overlaid or obscured by any portion of the aiming symbol. If processing unit 202 determines that the target is not obscured by any part of the aiming symbol (step 416), then the flow can be terminated. However, if (at step 416) processing unit 202 determines that any portion of the target is obscured by the aiming symbol, then processing unit 202 sends suitable control signals to a graphics generator (e.g., graphics display generator 210) or directly to the display (e.g., if a graphics generator is integrated into the display), which generates a suitable graphic symbol representing the aiming symbol (e.g., Flight Path Vector symbol) and increases the transparency of the particular parts of the aiming symbol that overlay or cover the target to be displayed (step 418). If the visual display is a heads-down PFD, then the graphics generator also generates a symbol that represents the target (e.g., runway symbol) on the visual display. However, if the visual display is a HUD, then the target may be seen directly through the HUD screen, and only the increased transparency aiming symbol is displayed. Thus, in accordance with the principles of the present invention, a method is provided for enhancing the visibility of targets viewed using onboard visual displays, in which the targets are obscured by symbols used to aim and/or control the aircraft. Advantageously, the present invention facilitates target aiming and aircraft control, which reduces pilot workload and navigation errors, and thus results in increased aircraft safety.

It is important to note that while the present invention has been described in the context of a fully functioning aircraft display system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular aircraft display system.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for enhancing target aiming and aircraft control using a visual display, comprising:
    a position and direction determination unit, said position and determination unit operable to determine at least one of a current position and a direction of an aircraft;
    a data storage unit, said data storage unit operable to store target data defining at least one of target location data and target boundary data; and
    a processing unit coupled to said position determination and direction unit and said data storage unit, said processing unit operable to:
    receive said current position and said direction of said aircraft;
    retrieve said target data;
    generate a first plurality of control signals for a visual display, said first plurality of control signals representing a flight control symbol for said visual display;
    determine if a portion of said flight control symbol for said visual display overlays a portion of a target for said visual display; and
    if said portion of said flight control symbol for said visual display overlays said portion of said target for said visual display, generate said first plurality of control signals for said visual display so as to adjust a transparency of said portion of said flight control symbol for said visual display such that said target is visible through said portion of said flight control symbol.

2. The system of claim 1, wherein said flight control symbol comprises an aiming symbol.

3. The system of claim 1, wherein said flight control symbol comprises a Flight Path Vector symbol.

4. The system of claim 1, wherein said target comprises a runway.

5. The system of claim 1, wherein said target comprises a high priority target.

6. The system of claim 1, wherein said generating operation comprises an operation of increasing said transparency of said portion of said flight control symbol.

7. The system of claim 1, wherein said visual display comprises a Heads-Down Display that is operable to display a visual representation of said flight control symbol and said target.

8. The system of claim 1, wherein said visual display comprises a Heads-Up Display that is operable to display a visual representation of said flight control symbol and enables an actual viewing of said target.

9. A display system for target aiming and aircraft control, comprising:
   means for determining at least one of a current position and a direction of an aircraft;
   means for storing target data defining at least one of target location data and target boundary data; and
   a processing unit coupled to said means for determining and said means for storing, said processing unit operable to:
   determine an aiming point for said aircraft;
   retrieve a target for display;
   generate a first plurality of control signals for a visual display, said first plurality of control signals representing a symbol located on said visual display at said aiming point for said aircraft;
   determine if a portion of said symbol obscures a portion of said target for display; and
   if said portion of said symbol obscures said portion of said target for display, generate said first plurality of control signals for said visual display so as to adjust a transparency of said portion of said symbol for said visual display such that said target is visible through said portion of said symbol.

10. The display system of claim 9, wherein said symbol comprises a Flight Path Vector symbol.

11. The display system of claim 9, wherein said target comprises a high priority target.

12. The display system of claim 9, wherein said target comprises a runway.

13. The display system of claim 9, wherein said target comprises an aircraft.

14. The display system of claim 9, wherein said generate operation comprises an operation to increase said transparency of said portion of said symbol.

15. The display system of claim 9, wherein said visual display comprises a Heads-Down Display that is operable to display a visual representation of said symbol and said target.

16. The display system of claim 9, wherein said visual display comprises a Heads-Up Display that is operable to display a visual representation of said symbol and enables an actual viewing of said target.

17. A method for facilitating target aiming and aircraft control using a visual display, comprising the steps of:
   receiving at least one of a current position and a direction of an aircraft;
   retrieving data defining a location of a target;
   generating a first plurality of control signals representing a flight control symbol for a visual display;
   determining if a portion of said flight control symbol for said visual display overlays a portion of a target for said visual display; and
   adjusting a transparency of said portion of said flight control symbol for said visual display such that said target is visible through said portion of said flight control symbol if said portion of said flight control symbol for said visual display overlays said portion of said target for said visual display.

18. The method of claim 17, wherein the adjusting step comprises a step of increasing said transparency of said portion of said flight control symbol.

19. A computer program product, comprising:
   a computer-usable medium having computer-readable code embodied therein for configuring a computer processor, the computer program product comprising:
   a first executable computer-readable code configured to cause a computer processor to determine at least one of a current position and a direction of an aircraft;
   a second executable computer-readable code configured to cause a computer processor to store target data defining at least one of target location data and target boundary data; and
   a third executable computer-readable code configured to cause a computer processor to determine an aiming point for said aircraft;
   a fourth executable computer-readable code configured to cause a computer processor to retrieve a target for display;
   a fifth executable computer-readable code configured to cause a computer processor to generate a first plurality of control signals for a visual display, said first plurality of control signals representing a symbol located on said visual display at said aiming point for said aircraft;
   a sixth executable computer-readable code configured to cause a computer processor to determine if a portion of said symbol obscures a portion of said target for display; and
   a seventh executable computer-readable code configured to cause a computer processor to generate said first plurality of control signals for said visual display so as to adjust a transparency of said portion of said symbol for said visual display such that said target is visible through said portion of said symbol if said portion of said symbol obscures said portion of said target.

20. The computer program product of claim 19, wherein said symbol comprises a Flight Path Vector symbol.

* * * * *